(12) United States Patent
Georgeson et al.

(10) Patent No.: US 9,305,344 B2
(45) Date of Patent: Apr. 5, 2016

(54) METHOD FOR IMPROVING LINEAR FEATURE DETECTABILITY IN DIGITAL IMAGES

(71) Applicant: The Boeing Company, Chicago, IL (US)

(72) Inventors: Gary E. Georgeson, Tacoma, WA (US); Morteza Safai, Newcastle, WA (US); William T. Edwards, Wentzville, MO (US); Matthew T. Grimshaw, Seattle, WA (US); James E. Engel, Huntington Beach, CA (US); Yuan-Jye Wu, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/258,432

(22) Filed: Apr. 22, 2014

(65) Prior Publication Data
US 2015/0302572 A1    Oct. 22, 2015

(51) Int. Cl.
*G06K 9/46* (2006.01)
*G01N 23/201* (2006.01)
*G06T 7/00* (2006.01)

(52) U.S. Cl.
CPC .............. *G06T 7/0004* (2013.01); *G06T 7/001* (2013.01); *G06T 2207/10012* (2013.01); *G06T 2207/10116* (2013.01); *G06T 2207/20224* (2013.01); *G06T 2207/30164* (2013.01)

(58) Field of Classification Search
CPC ............... G06T 7/0004; G06T 2207/10116; G06T 2207/20224; G06T 2207/10012; G06K 9/222; G06K 9/4604; G06K 9/50; G06K 2209/01; G06F 3/04883

USPC ......... 382/100, 202, 194, 195, 190, 191, 206, 382/207, 216, 218, 221, 255, 274, 285, 291, 382/296, 297, 305, 309, 173; 378/86, 87, 378/88, 145, 197, 125, 144, 131, 102, 146, 378/98.11, 98.12
See application file for complete search history.

(56) References Cited

U.S. PATENT DOCUMENTS

| | | | | |
|---|---|---|---|---|
| 4,809,314 A * | 2/1989 | Steele | .................... | G01B 7/285 378/145 |
| 7,236,564 B2 * | 6/2007 | Hopkins | ............... | G01T 1/2018 250/366 |
| 7,463,714 B2 * | 12/2008 | Edwards | ............. | G01N 23/203 378/86 |
| 7,508,910 B2 | 3/2009 | Safai et al. | | |
| 7,529,343 B2 | 5/2009 | Safai et al. | | |
| 7,561,753 B2 * | 7/2009 | Hutchinson | ............. | G06T 5/009 345/591 |
| 7,599,471 B2 | 10/2009 | Safai et al. | | |
| 7,623,626 B2 | 11/2009 | Safai et al. | | |
| 7,649,976 B2 | 1/2010 | Georgeson et al. | | |
| 8,033,724 B2 | 10/2011 | Edwards et al. | | |
| 8,094,781 B1 | 1/2012 | Safai et al. | | |
| 8,151,644 B2 * | 4/2012 | Brandt | .................... | G01H 9/00 73/643 |

(Continued)

*Primary Examiner* — Sheela C Chawan

(57) ABSTRACT

The present disclosure is generally directed to of method linear feature detection in a structure by providing a first digital image of the structure, creating a second corresponding digital image of the structure from the first digital image and determining a direction to shift pixels of the second corresponding digital image. A pixel shift value may be input to shift pixels of the second corresponding digital image, and pixels of the second corresponding digital image are shifted by the input pixel shift value in the determined direction. A third corresponding digital image of the structure may be calculated by subtracting the second corresponding digital image of the structure from the first digital image of the structure.

20 Claims, 9 Drawing Sheets

(56) References Cited

U.S. PATENT DOCUMENTS

| | | | |
|---|---|---|---|
| 8,525,979 B2* | 9/2013 | Lam | G01B 11/168 356/32 |
| 8,555,725 B2* | 10/2013 | Brandt | G01H 9/00 73/643 |
| 9,036,861 B2* | 5/2015 | Chen | G06T 7/0002 382/100 |

* cited by examiner

FIG. 5A
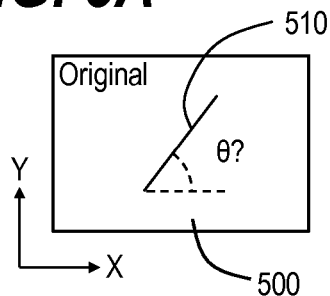
FIG. 5B
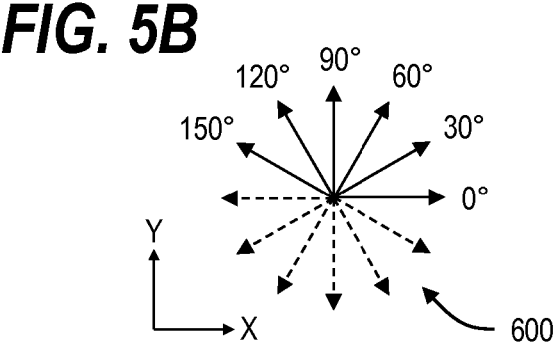
FIG. 5C
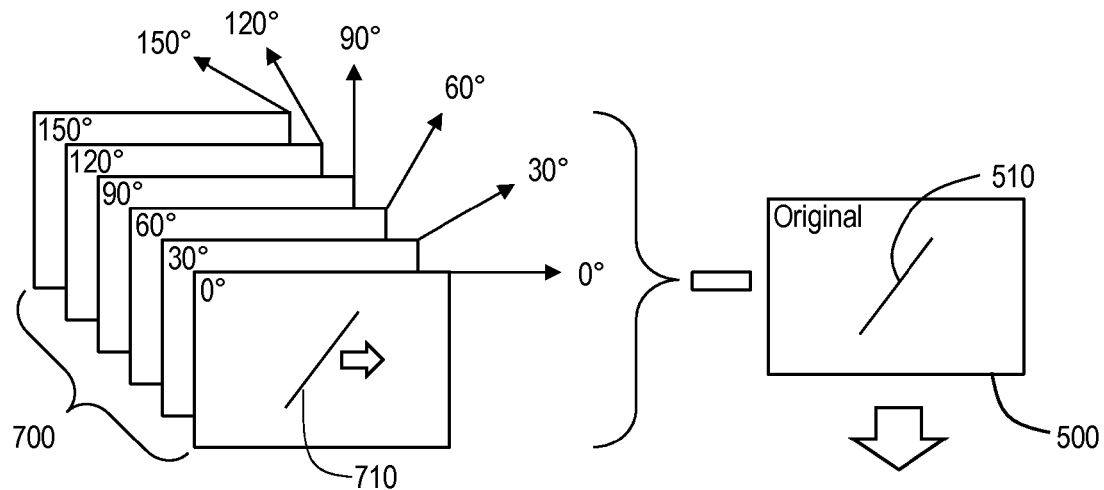
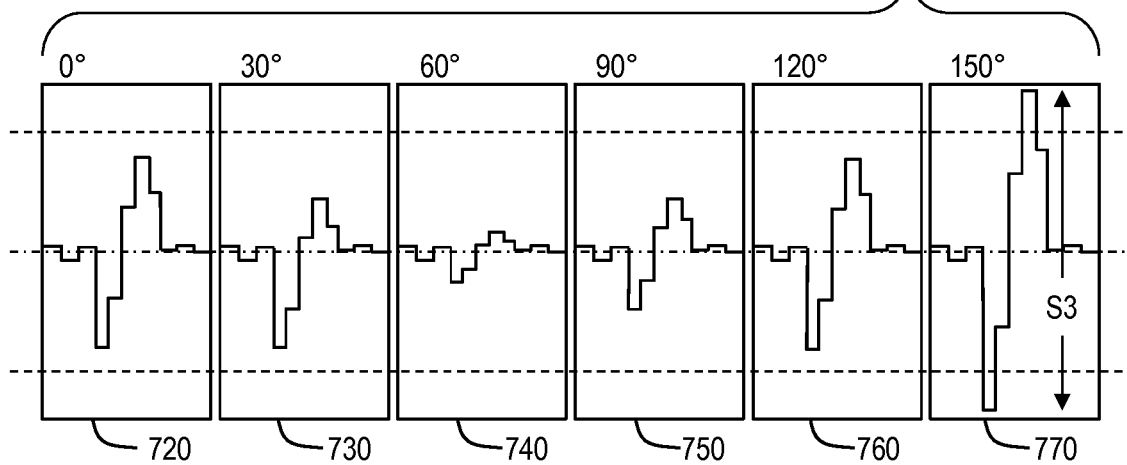
FIG. 5D
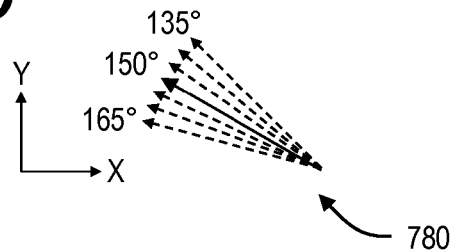

METHOD FOR IMPROVING LINEAR FEATURE DETECTABILITY IN DIGITAL IMAGES

TECHNICAL FIELD

The field of the embodiments presented herein is directed toward methods for improving the capability of structural analysis digital imaging systems, for example, X-ray backscatter systems, to detect small or otherwise difficult to detect linear features such as cracks, gaps or inclusions, that cause a local pixel intensity change across the linear feature in a digital image.

BACKGROUND

Non-destructive (NDE) imaging structural evaluation tools are able to detect linear features and other stress related deformities in structures, such as aircraft, in their early propagation stages before they reach critical size. Many of these small, often undetectable linear features produce a very low pixel signal strength difference over a couple of pixels relative to the surrounding structural material, thus necessitating a need to enhance their detectability and improve their inspection. X-ray backscatter imaging technology is one non-destructive structure evaluation tool that may image and detect quantifiable linear features, while other non-destructive structural analysis tools may be used, such as borescopic imaging of surface linear features during limited access inspections and photographic optical imaging of surface linear features on structures.

One way to improve signal-to-noise ratios for small flaw detection for x-ray backscatter methods is to improve the photon count statistics at the detectors by allowing more time to collect the signal. This is done by slowing down the system scanning speed which can significantly increase the inspection times making this approach impractical. It may also not improve linear crack detection since increasing the photon count alone (by slowing down a scan) improves the signal-to-noise only in the linear range of a detector, beyond which saturation occurs and crack detectability cannot be improved. There are various image enhancement methods that smooth or connect features, or enlarge them in the image plane, that increase the noise at the same time they increase the signal, thereby preventing any enhancement of linear feature detectability.

There is a need for increasing the pixel signal strength produced by linear cracks, while at the same time, smoothing or reducing the noise of the pixel signal intensity of the surrounding structural image pixels. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a method of linear feature detection in a structure includes providing a first digital image of a structure, and providing a second corresponding digital image of the structure from the first digital image. The second digital image is shifted by at least 1 pixel in a direction substantially perpendicular to a linear feature, and a third corresponding digital image of the structure is determined by subtracting the second corresponding digital image of the structure from the first digital image of the structure.

In another embodiment disclosed herein, a method of linear feature detection and determining an angle direction of a linear feature includes providing a first digital image of a structure and creating a plurality of second corresponding digital images of the structure from the first digital image. A plurality of incremented directions to shift pixels are determined for each one of the plurality of second corresponding digital images, respectively. A pixel shift value to shift pixels of each of the plurality of second corresponding digital images may be input and pixels of each of the plurality of second corresponding digital images are shifted by the input pixel shift value and in each of the determined plurality of incremented directions, respectively. A plurality of third corresponding digital images are calculated of the structure by subtracting each of the plurality of second corresponding digital images of the structure from the first digital image of the structure, respectively. One of the plurality of incremented directions corresponding to one of the plurality of third corresponding digital images may be then determined to have a highest signal-to-noise pixel ratio of a linear feature.

In another embodiment disclosed herein, a method of linear feature detection and determining a width of a linear feature, includes providing a first digital image of a structure and creating a plurality of second corresponding digital images of the structure from the first digital image. A direction to shift pixels of the plurality of second corresponding digital images may be determined and a plurality of corresponding incremental pixel shift values to shift pixels may be input for each of the plurality of second corresponding digital images, respectively. Pixels in each of the plurality of second corresponding digital images are shifted by each one of the plurality of corresponding incremental pixel shift values in the determined direction, respectively. A plurality of third corresponding digital images of the structure are calculated by subtracting the each of the plurality of second corresponding digital images of the structure from the first digital image of the structure. A width of a linear feature imaged in the structure of the first digital image may be determined based on one of the plurality of incremental pixel shift values be substantially equal to the width of the linear feature.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 5A illustrates a second embodiment of a method of linear feature detection further illustrating a structure image having a linear feature image within the imaged structure at a particular angle, according to at least one embodiment disclosed herein;

FIG. 5B illustrates the second embodiment of a method of linear feature detection further illustrating a rosette of predetermined angles, according to at least one embodiment disclosed herein;

FIG. 5C illustrates the second embodiment of a method of linear feature detection further illustrating plurality of second images being shifted according to the angles of FIG. 5B and corresponding angle specific pixel intensity graphs, according to at least one embodiment disclosed herein;

FIG. 5D illustrates the second embodiment of a method of linear feature detection further illustrating a second set of predetermined angles according to at least one embodiment disclosed herein;

DETAILED DESCRIPTION

The following detailed description is directed to methods for improving the capability of structural analysis digital imaging systems, for example, X-ray backscatter systems, to detect small or difficult to detect linear features by taking advantage of the fact that cracks found in many structural analysis applications have linear features along some or all of their length. Apriori information, such as the known orientation of potential linear features to be detected, allows specific data manipulation for enhancement of the linear feature pixel intensity signal relative to the noise around it, when such information is known. The methods of the invention substantially double the pixel signal strength produced by linear cracks while not increasing the noise of the pixel signal intensity of the surrounding structural image pixels by only smoothing or reducing the noise of the pixel signal intensity.

Figure 1:
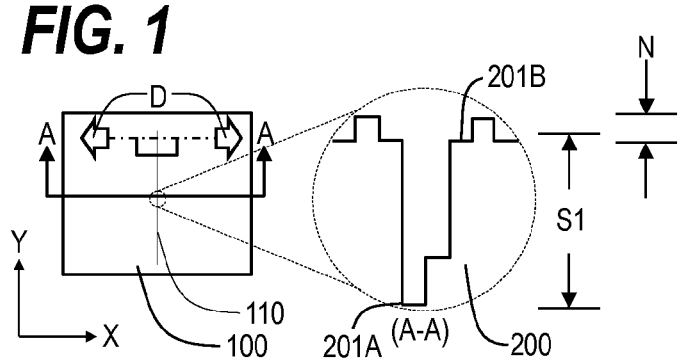
FIG. 1 illustrates a first embodiment of a method of linear feature detection further illustrating a structure image and a linear feature image within the imaged structure, according to at least one embodiment disclosed herein.

FIG. 1 illustrates a first embodiment of a method of linear feature detection further illustrating a structure digital image 100 and a linear feature image 110 that may be a crack within the structure digital image 100. A digital image may be made of a surface and a linear feature located therein. The digital image may include a visible light digital photograph, an x-ray backscatter digital image, other frequencies of electromagnetic energy such as microwave, terahertz, and thermographic, ultrasonic C-scan, eddy current scan, or MRI output rendered to a digital image for non-destructive structural analysis. A section line of pixel intensity A-A across the structure digital image 100 is provided to demonstrate a pixel intensity graph 200 (FIG. 2) representing a section of pixel intensity values of the digital image 100 that include the linear feature image 110. The linear feature image 110 is represented by the lower intensity notch 201A in pixel intensity graph 200 while the adjacent surface of the structure digital image 100 is represented by higher intensity areas 201B surrounding the lower intensity notch 201A in pixel intensity graph 200. A representative pixel noise N is illustrated showing a variation in pixel intensity for the higher intensity areas 102B of the structure digital image 100 adjacent to the linear feature image 110 represented by the lower intensity notch 102A in the pixel intensity graph 200.

Figure 2:
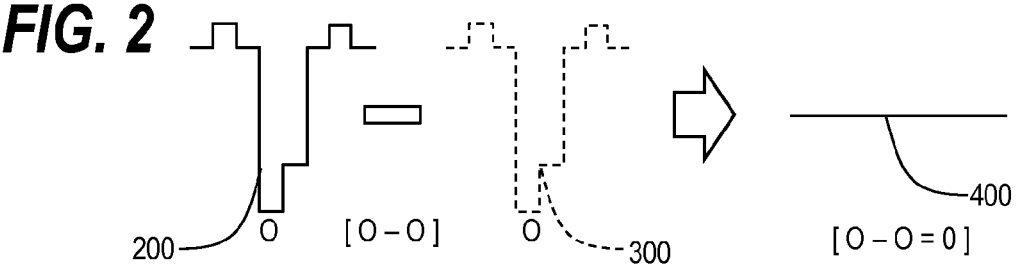
FIG. 2 illustrates the first embodiment of a method of linear feature detection further illustrating the subtraction of two pixel intensity graphs, according to at least one embodiment disclosed herein.

FIG. 2 illustrates a method of subtracting a structural digital image from itself, for example, structural digital image 100 of FIG. 1, represented by corresponding pixel intensity graph 200. The pixel intensity graph 200 of FIG. 1, indicated by an "O" for an "Original" digital image is illustrated next to a duplicate pixel intensity graph 300 being a copy of the pixel intensity graph 200. When pixel intensity graph 200 is subtracted from a duplicate pixel intensity graph 300, a subtracted result of pixel intensity graphs 400 shows no signal whatsoever, since the effect of subtracting two identical pixel strength images from each other cancels out any net signal. Another method of subtracting one image from itself may be to invert the values of one image and then add that image with another, identical non-inverted image.

Figure 3:
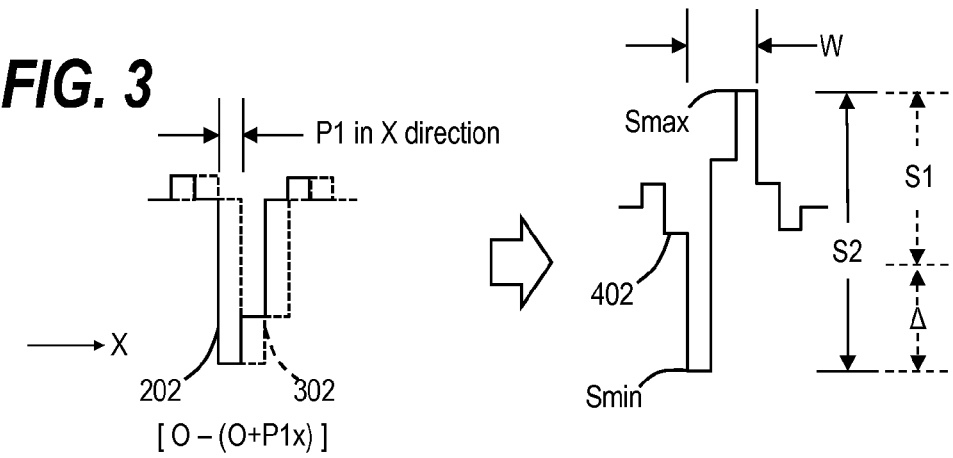
FIG. 3 illustrates the first embodiment of a method of linear feature detection further illustrating the subtraction of two pixel intensity graphs, shifted with respect to one another, according to at least one embodiment disclosed herein.

FIG. 3 illustrates the first embodiment of a method of linear feature detection further illustrating the subtraction of two structure digital images represented by a first pixel intensity graph 202 being subtracted from a duplicate pixel intensity graph 302 shifted at least one pixel relative to the first pixel intensity graph 202. Here, pixel intensity graph 202 may be copied to a duplicate first shifted pixel intensity graph 302 where the pixels are shifted an amount P1 in a direction X, corresponding to the X-Y coordinate axis of FIG. 1. The pixel shift direction D, as illustrated in FIG. 1, is substantially perpendicular to the direction of linear feature image 110 if the direction of linear feature image 110 may be typically known or generally anticipated from historical structural analysis. This subtraction process may be represented as:

$$O - (O + P1x)$$

where O may be the original pixel intensity image and P1$x$ may be the amount P1 of pixels shifted in a direction X. A subtracted result of pixel intensity graphs 402 is illustrated having a maximum pixel signal strength S2 having a total pixel intensity value from signal minimum Smin to signal maximum Smax. As illustrated by the subtraction of the two pixel intensity images, the maximum pixel signal strength S2 of linear feature image 110 may be effectively doubled in amplitude as compared to the original pixel signal strength S1 of pixel intensity graph 200, while the noise N stays approximately the same.

Additionally, illustrated in FIG. 2, may be a total pixel width of pixel intensity signals W generated by the pixel image intensity subtraction process. This total pixel width of pixel intensity signals W may be measured by the left-most edge of signal minimum Smin to the right-most edge of signal maximum Smax.

Figure 4:
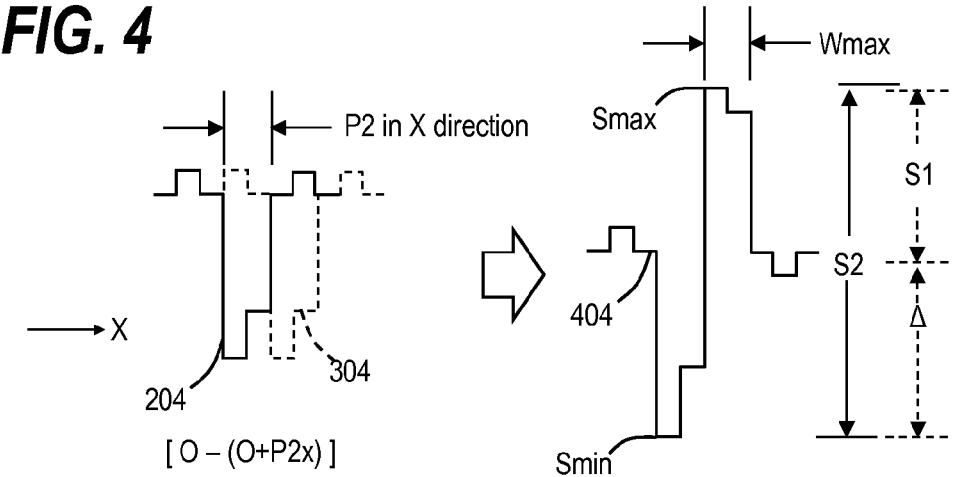
FIG. 4 illustrates the first embodiment of a method of linear feature detection further illustrating the subtraction of two pixel intensity graphs further shifted with respect to one another, according to at least one embodiment disclosed herein.

FIG. 4 illustrates an embodiment of a method of linear feature detection further illustrating the subtraction of two structure digital images represented by a first pixel intensity graph 204 being subtracted from a duplicate pixel intensity graph 304 shifted at least one pixel relative to the first pixel intensity graph 204. Here, pixel intensity graph 204 may be copied to a duplicate second shifted pixel intensity graph 304 where the pixels are shifted an amount P2 in a direction X, corresponding to the X-Y coordinate axis of FIG. 1. Again the pixel shift direction D, as illustrated in FIG. 1, is substantially perpendicular to the direction of linear feature image 110 if the direction of linear feature image 110 may be typically known or generally anticipated from historical structural analysis. This second subtraction process may be represented as:

$$O-(O+P2x)$$

where O may be the original pixel intensity image and P2$x$ may be the amount P2 of pixels shifted in a direction X, where P2>P1.

Additionally illustrated in FIG. 4 is a maximum signal width Wmax generated by the pixel image intensity subtraction process. This maximum signal width Wmax may be measured by the left-most edge of signal minimum Smin to the right-most edge of signal maximum Smax. In between W, no gap may be created by the pixel shift P2 value since the P2 may be substantially equal to the width of the linear feature image 110 and its corresponding pixel intensity graph.

FIG. 5A illustrates another embodiment of a method of detecting a relative angle of direction of a linear feature illustrating a structure digital image 500 having a linear feature image 510 within the surface of the structure digital image 500 having a particular angle of linear feature θ, that in this illustration may be unknown. FIG. 5B illustrates a rosette of predetermined angles 600 that are generated either by manual input of a user on a computer system, or by automatic determination by a computing device. The angles illustrated in the predetermined angles 600 show pixel shift angle directions that corresponding digital images may be shifted before the pixel intensity subtraction process, as described above, to identify which of the predetermined angles produce the most significant increase in pixel intensity after the subtraction process.

In this example, an angular increment of 30-degrees may be selected, where corresponding pixel shift angles, are calculated starting at 0 degrees up to but less than 180-degrees. For example, 30, 60, 90, 120 and 150-degree pixel shift angular directions are determined to shift pixels of respective images in each of these corresponding directions. Note that angles greater than or equal to 180-degrees are not necessary to consider, since in determining the direction of linear features such as cracks, all angles from 180-degrees to 0-degrees are merely the reciprocal of angles from 0-degrees to 180-degrees.

FIG. 5C further illustrates the embodiment of the method of linear feature detection of FIGS. 5A-5B illustrating a plurality of second digital images 700, wherein each image corresponding to the original structure digital image 500 of FIG. 5A, each image containing a linear feature 710 corresponding to the linear feature image 510 of FIG. 5A, and each image being pixel shifted to correspond to only one of the predetermined angles 600, as illustrated in FIG. 5B. Similar to FIGS. 3-4, each of the plurality of second images 700 are subtracted from the original structure digital image 500 containing the linear feature image 510. The resultant images are produced to display a series of images from the pixel intensity subtraction process as described above with respect to FIG. 3, however in this second embodiment, each resultant image is associated with one corresponding predetermined angle of the predetermined angles 600 of FIG. 5B. Thus, 0-degree direction pixel intensity graph 720, 30-degree direction pixel intensity graph 730, 60-degree direction pixel intensity graph 740, 90-degree direction pixel intensity graph 750, 120-degree direction pixel intensity graph 760, and 150-degree direction pixel intensity graph 770 are calculated based on the described digital image subtraction process. Each of the resultant series of subtracted digital images corresponds to a respective pixel intensity graph (e.g., 720-770), corresponding to the direction of a respective pixel shift direction. When the direction of the angle of the pixel shift is closest to a direction perpendicular to the linear feature image 510, the maximum pixel signal strength signal maximum Smax S3 will be greatest compared to others of the resultant subtracted pixel intensity graphs. For example, when the direction of the angle of the pixel shift is closest to being parallel with the linear feature image 510, the resultant subtracted pixel intensity graph will have a minimum value, as the 60-degree direction pixel intensity graph 740 illustrates. Likewise, the 150-degree direction pixel intensity graph 770 illustrates that the 150-degree pixel shift direction is closest to being perpendicular to the linear feature image 510 of structure digital image 500, since it displays the maximum pixel signal strength over the remaining graphs. By analysis of each resultant subtracted structure digital image, (as represented by the pixel intensity graphs 720-770), and noting the corresponding angle of direction of pixel shift, the angle of direction of the linear feature image 510 can be determined, either manually or automatically by a computer image analysis algorithm, based on the maximum pixel signal strength and perpendicular to the corresponding angle of direction of pixel shift.

FIG. 5D illustrates the another embodiment of a method of linear feature detection of FIGS. 5A-5C, further illustrating a second set of predetermined angles 780 used to further determine a more precise angle of the direction of the linear feature image 510 over the angle determined in FIG. 5C. In this illustration, the second set of predetermined angles 780 are prepared to shift a new set of images created from structure digital image 500 having linear feature image 510 thereon, where the second set of predetermined angles 780 are selected to center around the previously determined angle of the linear feature image 510 in FIGS. 5A-5C, for example, the 150-degree direction pixel intensity graph 770. Here, for example, +15-degrees on either side of the previously determined 150-degree angle (from FIG. 5C) may determine a second set of predetermined angles 780 to provide a more precise determination of an angular direction of the linear feature image 510 in structure digital image 500. For example, a range from 135-degrees to 165-degrees having angular increments of 5 degrees, (as shown), or in increments of a single or any other incremental degree (not shown) around the previously determined angle, may be used. In this manner, a third series of images, (not shown, but in the same manner as illustrated in FIG. 5D), may also be created by pixel shifting each image by one angle of the predetermined angle 780 to more precisely determine which angle the linear feature image 510 may be oriented in the structure digital image 500. Again, when the direction of the angle of the pixel shift is closest to a direction perpendicular to the linear feature image 510, the maximum pixel signal strength signal maximum will be greatest compared to others of the resultant subtracted pixel intensity graphs. This method effectively allows for the identification of linear features such as small cracks at an unknown angle and allows more precise imaging to quantify linear features that have a known angle.

Figure 6A:
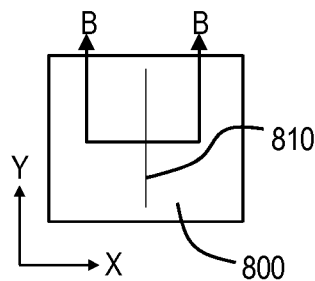
FIG. 6A illustrates a third embodiment of a method of linear feature detection further illustrating a surface and a linear feature within the surface, according to at least one embodiment disclosed herein.

FIG. 6A illustrates a method of detection of the width of the linear feature further illustrating a surface digital image 800 and a linear feature image 810 within the surface digital image 800. Similar to FIGS. 1 and 5A, a digital image is made of a surface with a linear feature located therein. A section line of pixel intensity B-B across the surface digital image 800 is provided to demonstrate a pixel intensity graph 900 representing a section of pixel intensity values of the surface digital image 800 that include the linear feature image 810. The linear feature 810 may be represented by the lower pixel intensity notch 901A in linear feature image 810 while the adjacent surface may be represented by higher pixel intensity areas 901B surrounding the notch 901A in surface digital image 800.

Figure 6B:
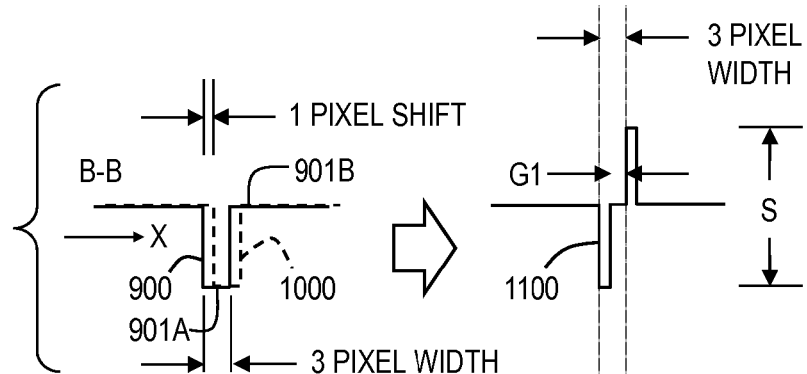
FIG. 6B illustrates the third embodiment of a method of linear feature detection further illustrating the subtraction of two pixel intensity graphs shifted with respect to one another, according to at least one embodiment disclosed herein.

In the following examples of FIGS. 6B-6E, the linear feature image 810, for example, has a width of 3 pixels. However, for the purposes of this example, the linear feature width may be assumed to be unknown to the user. FIG. 6B illustrates the method of detection of the width of the linear feature further illustrating the subtraction of two pixel intensity graphs shifted with respect to one another. The surface digital image 800 represented by the pixel intensity graph 900 may be copied to create a duplicate first shifted pixel intensity graph 1000 that is then shifted by a width of 1 pixel in the X direction relative to the X-Y coordinate axis of FIG. 6A. The surface digital image 800 represented by the pixel intensity graph 900 may be then subtracted from a duplicate pixel shifted surface digital image represented by the first shifted pixel intensity graph 1000 to produce a subtracted result of pixel intensity graphs 1100 having a pixel signal strength S approximately twice the pixel intensity of the linear feature image 810 as represented in signal pixel intensity graph 900. Note that pixel gap G1 exists between the opposing pair of minimum and maximum signal pixel intensity values of the subtracted result of pixel intensity graphs 1100. As long as a gap appears between the maximum and minimum signal pixel intensity values, the pixel shift value does not equal the width to the linear feature image 810.

Figure 6C:
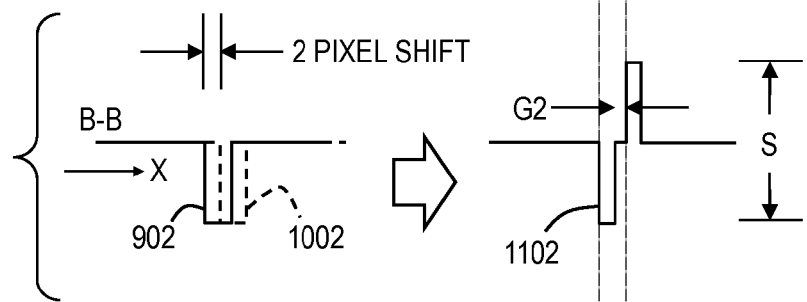
FIG. 6C illustrates the third embodiment of a method of linear feature detection further illustrating the subtraction of two pixel intensity graphs further shifted with respect to one another, according to at least one embodiment disclosed herein.

FIG. 6C illustrates the method of detection of the width of the linear feature corresponding to FIG. 6B, further illustrating the subtraction of two pixel intensity graphs that have been further pixel shifted with respect to one another. The surface digital image 800 represented by the pixel intensity graph 902 may be copied and to create a duplicate surface digital image (represented first shifted pixel intensity graph 1002) that may be then shifted by a width of 2 pixels in the X direction relative to the X-Y coordinate axis of FIG. 6A. The surface digital image 800 represented by pixel intensity graph 902 may be then subtracted from a duplicate surface digital image represented by the first shifted pixel intensity graph 1002 to produce a subtracted result surface digital image represented by pixel intensity graph 1102 having a similar pixel signal strength S with respect to FIG. 6B. Note a narrower pixel gap G2 exists between the opposing pair of minimum and maximum signal pixel intensity values of the subtracted result of pixel intensity graphs 1102.

Figure 6D:
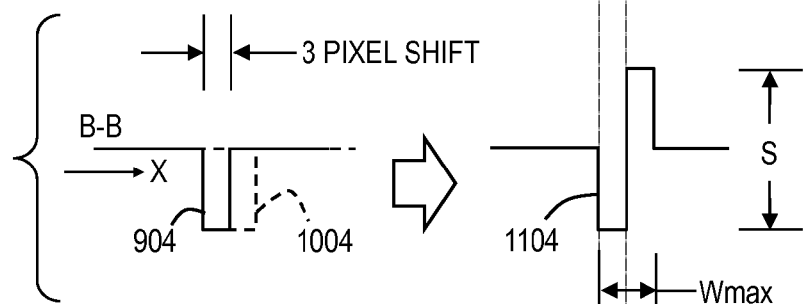
FIG. 6D illustrates the third embodiment of a method of linear feature detection further illustrating the subtraction of two pixel intensity graphs further shifted with respect to one another, according to at least one embodiment disclosed herein.

FIG. 6D illustrates the method of detection of the width of the linear feature corresponding to FIGS. 6B-6C, further illustrating the subtraction of two pixel intensity graphs that have been further pixel shifted with respect to one another. The surface digital image 800 represented by the pixel intensity graph 904 may be copied and to create a duplicate surface digital image (represented first shifted pixel intensity graph 1004) that may be then shifted by a width of 3 pixels in the X direction relative to the X-Y coordinate axis of FIG. 6A. The surface digital image 800 represented by pixel intensity graph 904 may be then subtracted from a duplicate surface digital image represented by the first shifted pixel intensity graph 1004 to produce a subtracted result surface digital image represented by pixel intensity graph 1104 having a similar pixel signal strength S with respect to FIGS. 6B-6C. Note no gap exists between the opposing pair of minimum and maximum signal pixel intensity values of subtracted result of pixel intensity graphs 1100, and therefore, the pixel shift value is equal to the width of the linear feature image 810.

Figure 6E:
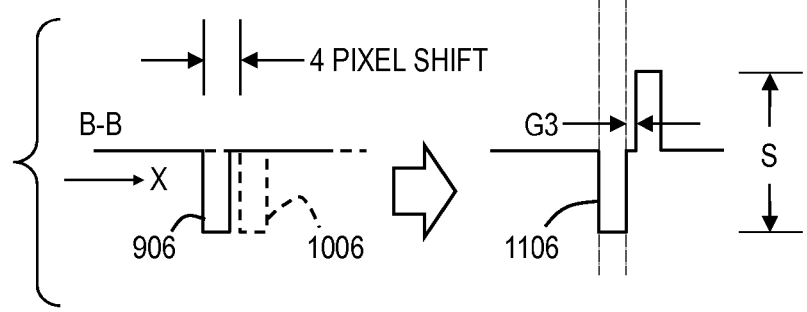
FIG. 6E illustrates the third embodiment of a method of linear feature detection further illustrating the subtraction of two pixel intensity graphs further shifted with respect to one another, according to at least one embodiment disclosed herein.

FIG. 6E illustrates the method of detection of the width of the linear feature corresponding to FIGS. 6B-6D, further illustrating the subtraction of two pixel intensity graphs that have been further pixel shifted with respect to one another. The surface digital image 800 represented by the pixel intensity graph 906 may be copied and to create a duplicate surface digital image (represented first shifted pixel intensity graph 1006) that may be then shifted by a width of 4 pixels in the X direction relative to the X-Y coordinate axis of FIG. 6A. The surface digital image 800 represented by pixel intensity graph 906 may be then subtracted from a duplicate surface digital image represented by the first shifted pixel intensity graph 1006 to produce a subtracted result surface digital image represented by pixel intensity graph 1106 having a similar pixel signal strength S with respect to FIGS. 6B-6D. Note pixel gap G3 now exists between the opposing pair of minimum and maximum signal pixel intensity values of subtracted result of pixel intensity graphs 1106 since the pixel shift of 4 pixels may be larger than the width of the linear feature.

Figure 7:
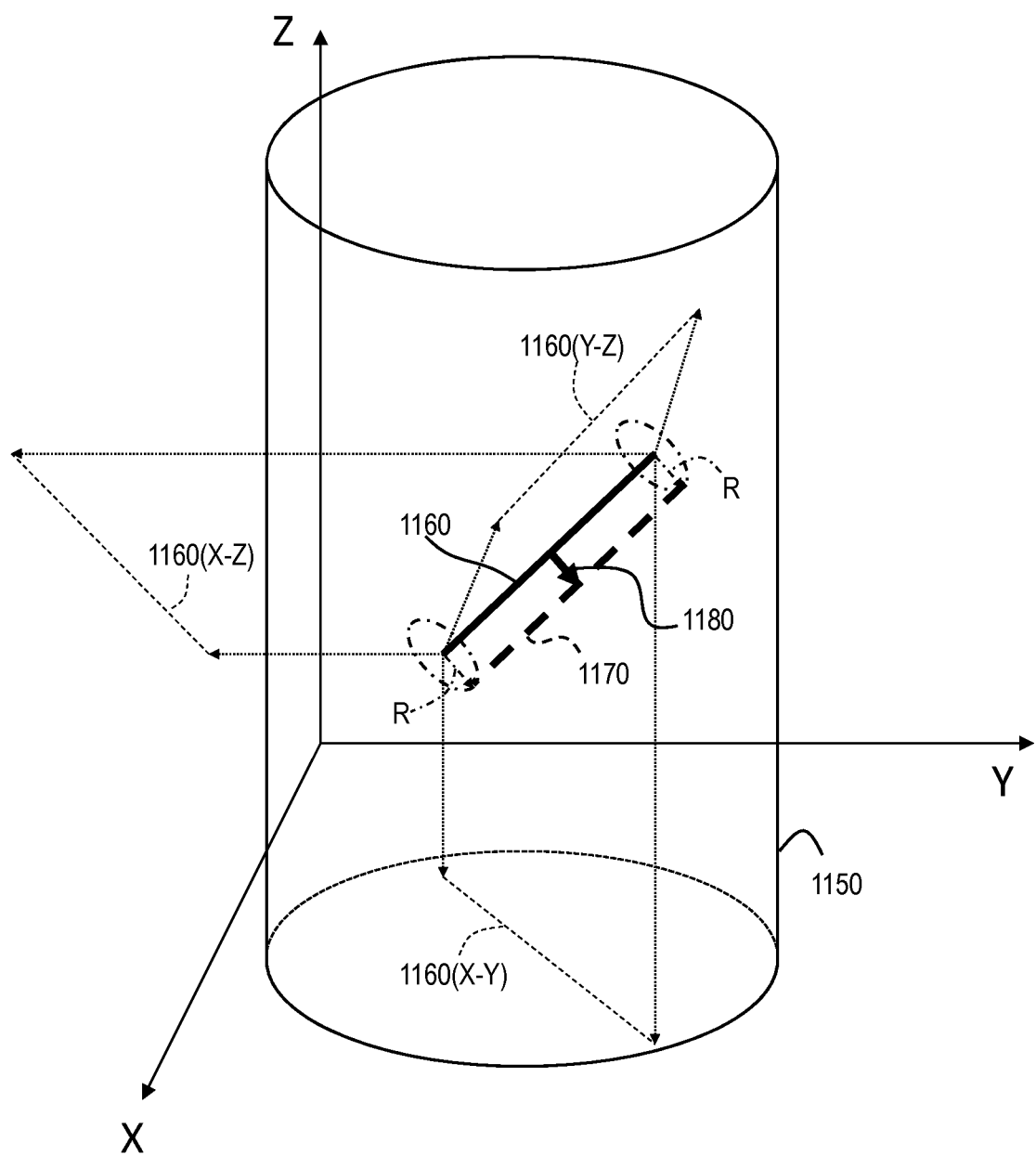
FIG. 7 illustrates an application of the methods described herein of linear feature detection applied to a three-dimensional digital image.

FIG. 7 illustrates an application of the methods described herein applied to a three-dimensional digital image 1150 such as output from a CT scan, wherein planar linear features may be detected by the same means as in a two-dimensional image. Here, a three-dimensional (3-D) digital image 1150 represents a cylinder with its base on the X-Y plane of a coordinate system XYZ. A 3-D linear feature image 1160 is indicated within the digital image 1150 and represented by corresponding projections 1160(X-Y) on the X-Y plane, 1160(X-Z) on the X-Z plane and 1160(Y-Z) on the Y-Z plane. A 3-D linear feature second image 1170 is generated from the 3-D linear feature image 1160, that may include only the 3-D linear feature second image (as shown), or may additionally include the complete corresponding 3-D digital image 1150 (not shown).

The 3-D linear feature second image 1170 is shifted in a manner so as to be parallel to the original 3-D linear feature image 1160. In this illustration, a radius R indicates the position and orientation of the 3-D linear feature second image 1170 relative to the 3-D linear feature image 1160 such that both image lines 1160 and 1170 are substantially parallel to each other being shifted by a distance and a direction represented by vector 1180. The method then would subtract the pixel intensity of 1160 from 1170 in the direction represented by vector 1180 in incremental distances to determine the size and direction of the original 3-D linear feature image 1160 in the same methods described above with respect to the two-dimensional methods.

Figure 8:
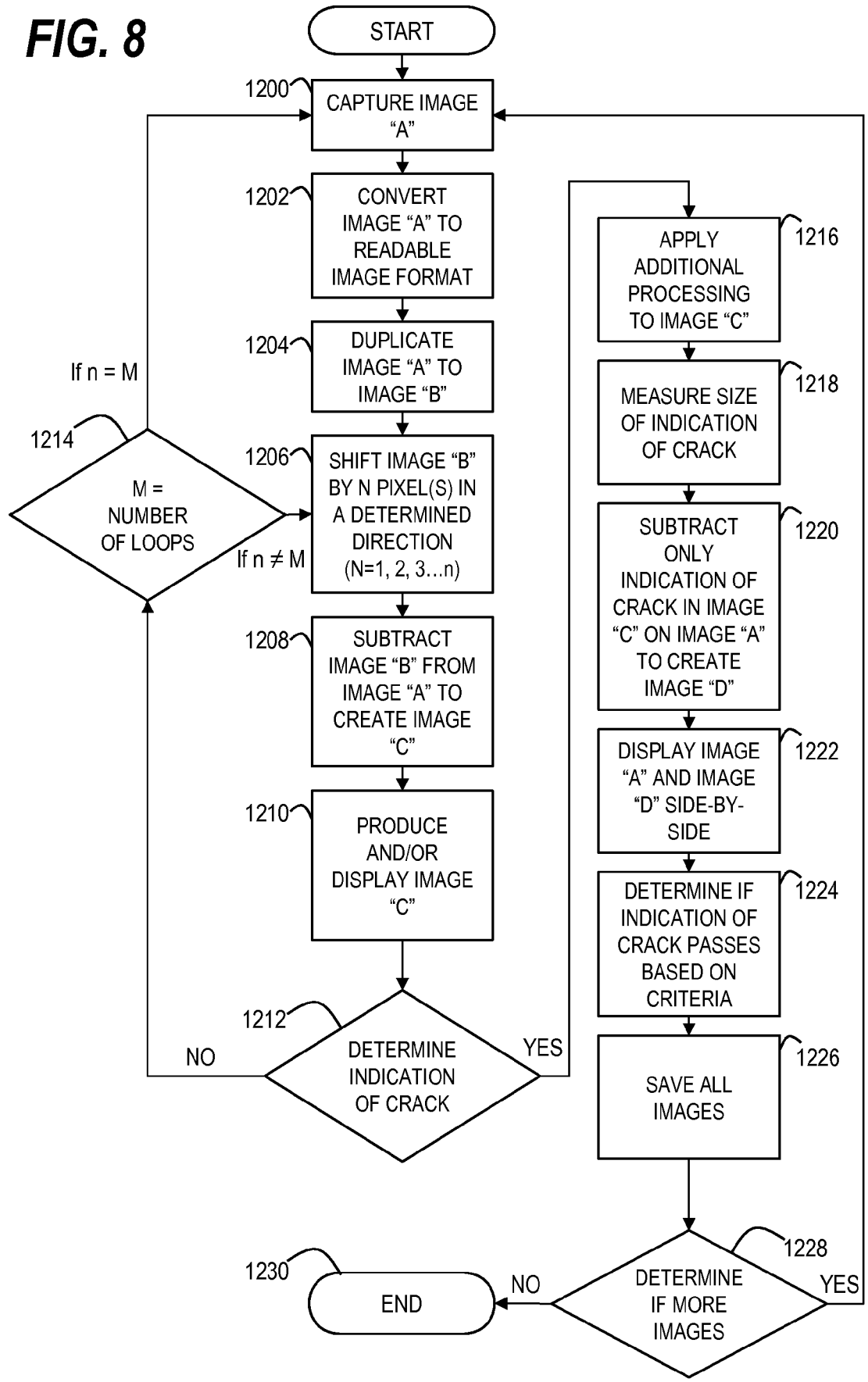
FIG. 8 illustrates a logic flowchart for a method of linear feature detection, according to at least one embodiment disclosed herein.

FIG. 8 illustrates a logic flowchart for a method of linear feature detection according to at least one embodiment disclosed herein. An x-ray backscatter digital image or other digital image of a structure may be captured 1200 where important linear features may be difficult to find. The digital image may then be converted 1202 to a readable image format, if necessary. A duplicate image may be created 1204 of the digital image. The duplicate image may be shifted 1206 by a determined pixel shift value relative to the original image in a direction perpendicular to the expected crack (or other linear feature) direction if one may be known or expected. The shifted duplicate image may be subtracted 1208 from the original image to produce and/or display 1210 a new image where cracks and other linear features perpendicular to the shift are enhanced, while other linear features are smoothed out. A determination may be made 1212 as to whether there may be an indication of a crack. If no indication may be made, a determination may be made 1214 as to whether the number of shifted pixels "n" is equal to a number of loops "M". If not, the process reverts back to shifting 1206 the pixels by a new pixel shift value to determine if there are any more linear features that can be analyzed.

The two images, (the original and the duplicate to be subtracted), may be shifted 1216 by another pixel shift value in the same direction of the previous pixel shift in step 1206. This may be done by manually receiving input from a user to select an arrow key or combination of arrow keys on a computer keyboard to produce a pixel shift in a desired direction, or may be accomplished automatically under computer processor control. Additionally, processing 1216 to the image may including iteratively determining the angle of the linear feature as depicted in FIGS. 5A-5D and described above, and/or determining the width of the linear feature as depicted in FIGS. 6A-6E and described above. For example, the size of the linear feature may be measured 1218 by increasing or decreasing the pixel shift value in a direction substantially perpendicular to the linear feature image until a maximum signal is produced with no gaps, as shown in FIG. 6D.

The original image may be subtracted 1220 from a portion of the additionally processed image, that contains only an indication of the linear feature, to create a new image. Thereafter, the original image and the portion of the image that contains the indication of the linear feature may be displayed 1222 side-by-side for analysis. A determination 1224 is then be made as to whether the pixel signal intensity value of the linear feature is above below a predefined threshold criteria. All images are then saved 1226, and a determination 1228 may be made whether more images need to be obtained and processed. If no further images are needed, the method ends at the terminus 1230.

Figure 9:
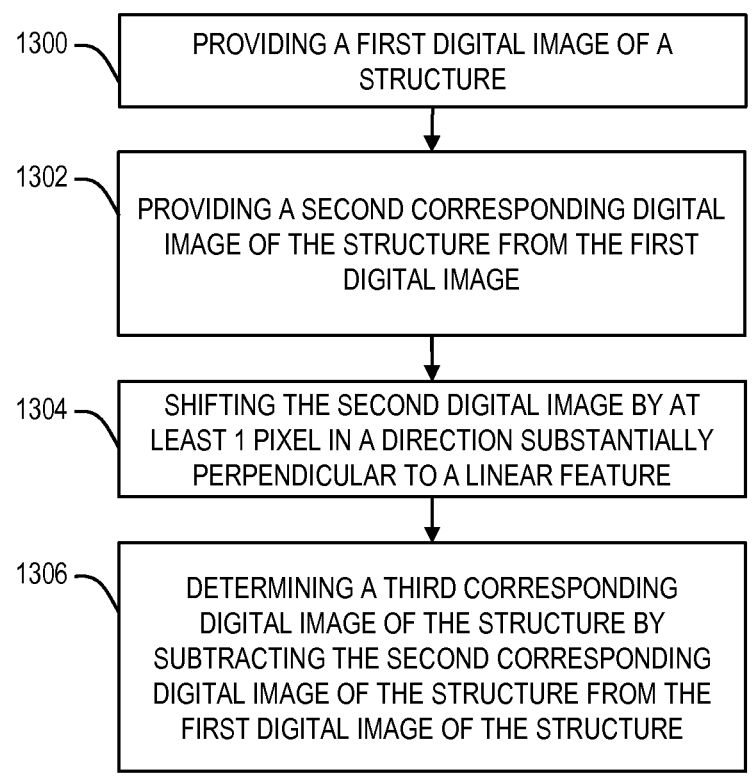
FIG. 9 illustrates another logic flowchart for another method of linear feature detection according to at least one embodiment disclosed herein.

FIG. 9 illustrates another logic flowchart for another a method of linear feature detection in a structure includes providing 1300 a first digital image of a structure, and providing 1302 a second corresponding digital image of the structure from the first digital image. The second digital image is shifted 1304 by at least 1 pixel in a direction substantially perpendicular to a linear feature, and a third corresponding digital image of the structure is determined 1306 by subtracting the second digital image of the structure from the first digital image of the structure.

Additionally, a new incremental pixel shift value may be input to shift pixels of the third corresponding digital image, and the computing device may shift the pixels of the third corresponding digital image by the inputted new incremented pixel shift value, in the determined direction. Thereafter, a fourth corresponding digital image of the structure may be provided by the computing device by subtracting the third corresponding digital image of the structure from the first digital image of the structure, where the fourth corresponding digital image further graphically enhances a linear feature on the structure imaged in the first digital image.

Figure 10:
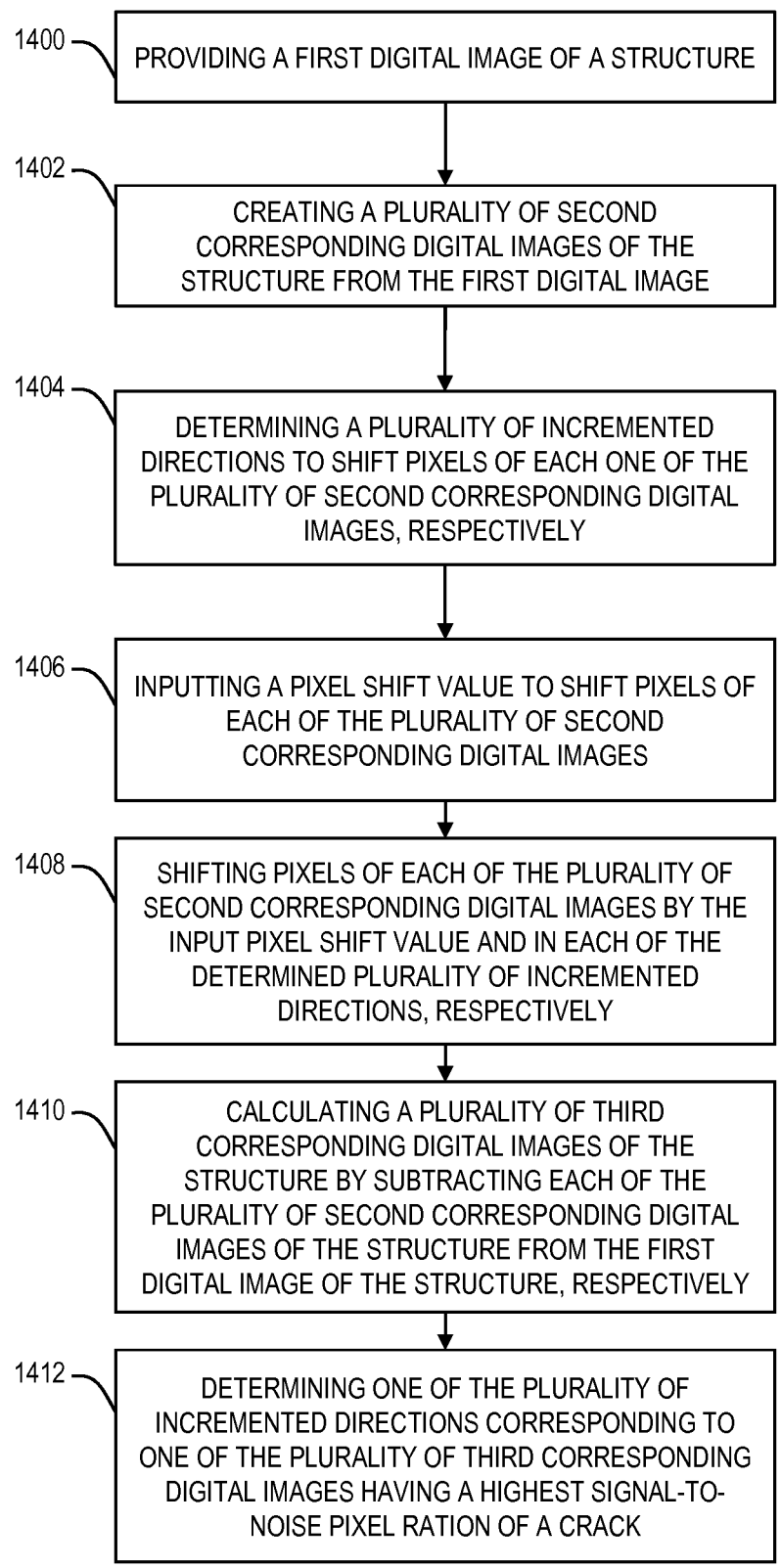
FIG. 10 illustrates another logic flowchart for another method of linear feature detection, according to at least one embodiment disclosed herein.

FIG. 10 illustrates another logic flowchart for another method of linear feature detection including providing 1400 a first digital image of a structure, for example, an X-ray backscatter image. A plurality of second corresponding digital images of the structure are created 1402 by a computing device from the first digital image. A plurality of incremental directions to shift pixels of each one of the plurality of second corresponding digital images, respectively, may be determined 1404 by the computing device. A pixel shift value to shift pixels, for example, between 1 to 5 pixels, of each of the plurality of second corresponding digital images may be input 1406, and thereafter pixels of each of the plurality of second corresponding digital images may be shifted 1408 by the computing device by the input pixel shift value and in each of the determined plurality of incremented directions, respectively. A plurality of third corresponding digital images of the structure may be created 1410 by the computing device by subtracting each of the plurality of second corresponding digital images of the structure from the first digital image of the structure, respectively. One of the plurality of incremented directions corresponding to one of the plurality of third corresponding digital images is determined 1412 by the computing device having a highest signal-to-noise pixel ratio of the linear feature, and is closest to a perpendicular direction of the linear feature on the structure imaged in the first digital image.

A new set of directions to shift pixels of the one of the plurality of third corresponding digital images may be determined by the computing device, based on the determined one of the plurality of incremented directions being the closest to perpendicular to a direction of the linear feature on the structure imaged in the first digital image. A plurality of fourth corresponding digital images of the structure may be created by the computing device corresponding to the each of the new set of directions, respectively. Pixels of each of the plurality of fourth corresponding digital images may by shifted by the computing device by the input pixel shift value in each of the new set of directions, respectively. A plurality of fifth corresponding digital images of the structure may be calculated by the computing device, by subtracting each one of the plurality of fourth corresponding digital images of the structure from the first digital image of the structure, respectively. Finally, one of the new set of directions corresponding to one of the plurality of fifth corresponding digital images may be determined by the computing device as having the highest signal-to-noise pixel ratio of the linear feature, the one of the new set of incremented directions being substantially perpendicular to the direction of the linear feature on the structure imaged in the first digital image.

Figure 11:
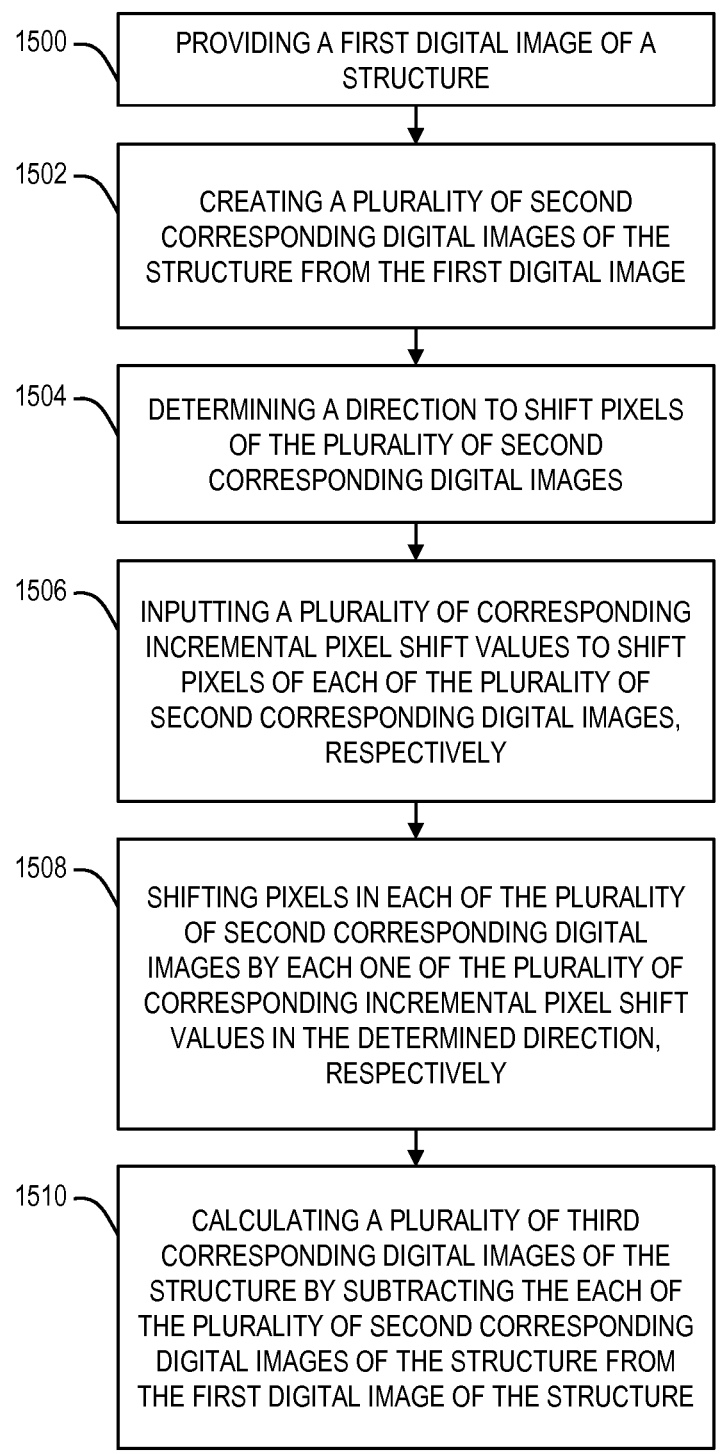
FIG. 11 illustrates another logic flowchart for another method of linear feature detection, according to at least one embodiment disclosed herein.

FIG. 11 illustrates another logic flowchart for another method of linear feature detection by providing 1500 a first digital image of a structure, where the digital image is an X-ray backscatter image, and creating 1502, by the computing device, a plurality of second corresponding digital images of the structure from the first digital image. A direction to shift pixels of the plurality of second corresponding digital images is determined 1504 either manually by selecting an angle closest to perpendicular to a direction of a linear feature in the structure, or automatically by an iterative process of determining, by the computing device, an angle of a linear feature in the structure of the first digital image and selecting a direction closest to perpendicular to the angle of the linear feature in the structure of the first digital image.

A plurality of corresponding incremental pixel shift values may be input 1506 to shift pixels of each of the plurality of second corresponding digital images, respectively. Pixels in each of the plurality of second corresponding digital images may by shifted 1508 by the computing device by each one of the plurality of corresponding incremental pixel shift values in the determined direction, respectively. A plurality of third corresponding digital images of the structure may be calculated 1510 by the computing device by subtracting the each of the plurality of second corresponding digital images of the structure from the first digital image of the structure.

A width of a linear feature imaged in the structure of the first digital image may be determined either by a computing device or manually based on one of the plurality of incremental pixel shift values being substantially equal to the width of the linear feature, and one of the plurality of third corresponding digital images is determined by the computing device to have the widest contiguous shift and highest signal-to-noise pixel increase corresponding to the linear feature in the structure of the first digital image.

The methods indicated in FIGS. 7-11 may be accomplished via a computing device executing programmable software to determine a potential linear feature occurring within the scope of the computing device. A person may review the images or data afterwards and make a decision, or the computing device may fully indicate linear features observed and report the findings of the corresponding linear features without any user intervention.

Figure 12:
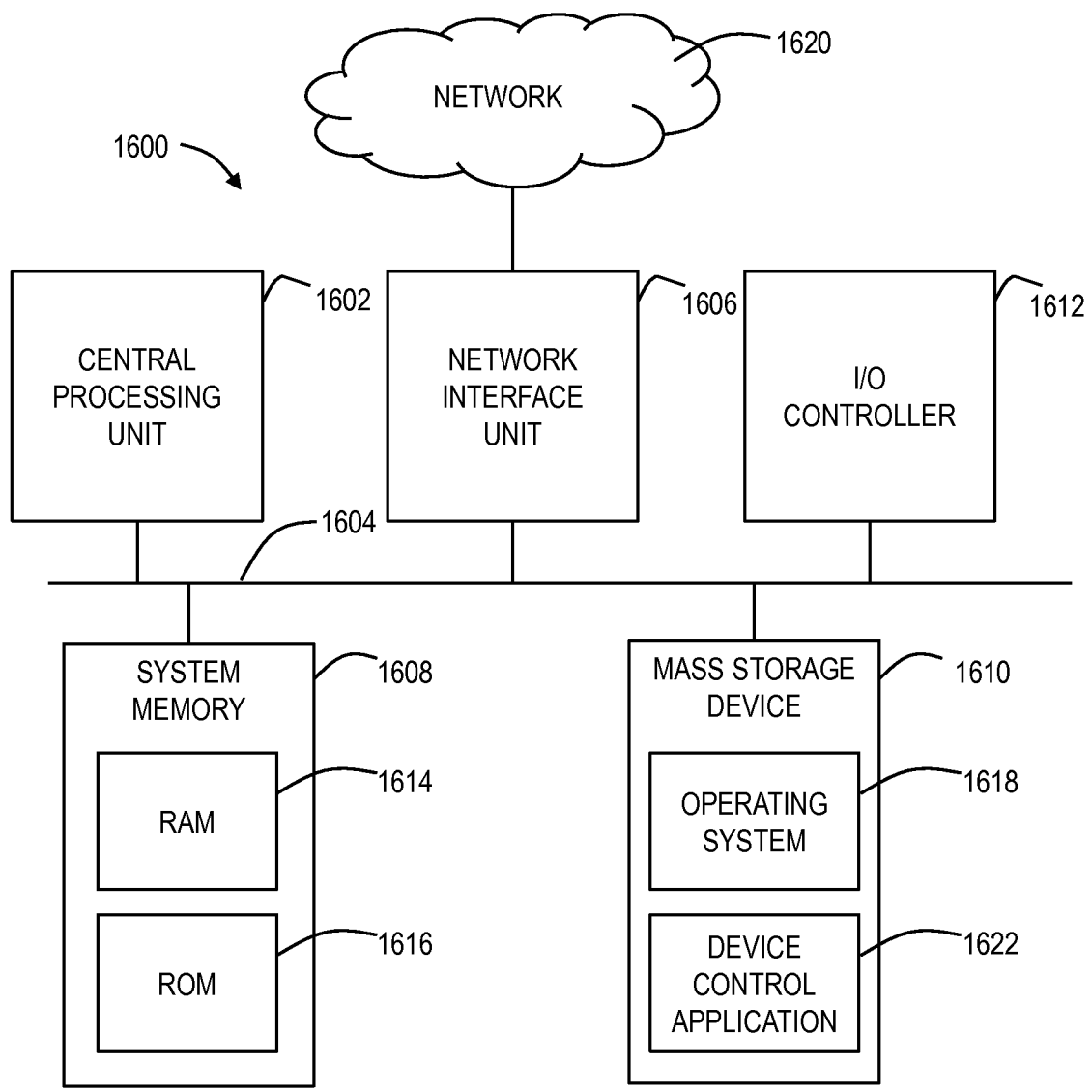
FIG. 12 illustrates a computer architecture diagram showing an illustrative computer hardware and software architecture for a computing system capable of implementing the embodiments presented herein.

FIG. 12 illustrates a computer architecture diagram showing an illustrative computer hardware and software architecture for a computing system capable of implementing the methods presented herein. FIG. 12 shows an illustrative computer architecture for a computer system 1600 capable of executing the software components described herein for implementing the embodiments described above. The computer architecture shown in FIG. 12 illustrates a conventional desktop, laptop computer, server computer, tablet computer, smartphone, electronic reader, MP3 player or other digital music device, or any computer configured for use with a structural analysis system and may be utilized to implement the computer 1600 and to execute any of the other software components described herein.

The computer architecture shown in FIG. 12 includes a central processing unit 1602 (CPU) or processor, a system memory 1608, including a random access memory 1614 (RAM) and a read-only memory (ROM) 1616, and a system bus 1604 that couples the memory to the CPU 1602. A basic input/output system (BIOS) containing the basic routines that help to transfer information between elements within the computer 1600, such as during startup, may be stored in the ROM 1616. The computer 1600 further includes a mass storage device 1610 for storing an operating system 1618, application programs, and other program modules, which will be described in greater detail below.

The mass storage device 1610 may be connected to the CPU 1602 through a mass storage controller (not shown) connected to the bus 1604. The mass storage device 1610 and its associated computer-readable media provide non-volatile storage for the computer 1600. Although the description of computer-readable media contained herein refers to a mass storage device, such as a hard disk or CD-ROM drive, it should be appreciated by those skilled in the art that computer-readable storage media can be any available computer storage media that can be accessed by the computer 1600.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but may be not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any non-transitory medium which can be used to store the desired information and which can be accessed by the computer 1600.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 1600 may operate in a networked environment using logical connections to remote computers through a network such as the network 1620. The computer 1600 may connect to the network 1620 through a network interface unit 1606 connected to the bus 1604. It should be appreciated that the network interface unit 1606 may also be utilized to connect to other types of networks and remote computer systems. The computer 1600 may also include an input/output controller 1612 for receiving and processing input from a number of other devices, including a touchscreen interface, keyboard, mouse, joystick, or electronic stylus (not shown in FIG. 12). Similarly, an input/output controller may provide output to a display screen, a printer, or other type of output device (also not shown in FIG. 12).

As mentioned briefly above, a number of program modules and data files may be stored in the mass storage device 1610 and RAM 1614 of the computer 1600, including an operating system 1618 suitable for controlling the operation of a networked desktop, laptop, tablet, smartphone, electronic reader, digital music player, server, or flight computer. The mass storage device 1610 and RAM 1614 may also store one or more program modules. In particular, the mass storage device 1610 and the RAM 1614 may store the device control application 1622 executable to perform the various operations described above. The mass storage device 1610 and RAM 1614 may also store other program modules and data.

In general, software applications or modules may, when loaded into the CPU 1602 and executed, transform the CPU 1602 and the overall computer 1600 from a general-purpose computing system into a special-purpose computing system customized to perform the functionality presented herein. The CPU 1602 may be constructed from any number of transistors or other discrete circuit elements, which may individually or collectively assume any number of states. More specifically, the CPU 1602 may operate as one or more finite-state machines, in response to executable instructions contained within the software or modules. These computer-executable instructions may transform the CPU 1602 by specifying how the CPU 1602 transitions between states, thereby physically transforming the transistors or other discrete hardware elements constituting the CPU 1602.

Encoding the software or modules onto a mass storage device may also transform the physical structure of the mass storage device or associated computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media may be implemented as semiconductor-based memory, the software or modules may transform the physical state of the semiconductor memory, when the software may be encoded therein. For example, the software may transform the states of transistors, capacitors, or other discrete circuit elements constituting the semiconductor memory.

As another example, the computer-readable storage media may be implemented using magnetic or optical technology. In such implementations, the software or modules may transform the physical state of magnetic or optical media, when the software may be encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The subject matter described above may be provided by way of illustration only and should not be construed as limiting. Various modifications and changes may be made to the subject matter described herein without following the example embodiments and applications illustrated and described, and without departing from the true spirit and scope of the present disclosure, which may be set forth in the following claims.

The invention claimed is:

1. A method of linear feature detection in a structure comprising:
   providing a first digital image of a structure;
   providing a second corresponding digital image of the structure from the first digital image;
   shifting the second digital image by at least 1 pixel in a direction substantially perpendicular to a linear feature; and
   determining a third corresponding digital image of the structure by subtracting the second corresponding digital image of the structure from the first digital image of the structure.

2. The method of linear feature detection according to claim 1, where the third corresponding digital image being capable of graphically enhancing a linear feature on the structure imaged in the first digital image by increasing a signal-to-noise pixel ratio of the imaged linear feature on the structure in the first digital image.

3. The method of linear feature detection according to claim 1, wherein the first digital image of the structure includes one of:
   an X-ray backscatter image; or
   a three-dimensional image.

4. The method of linear feature detection according to claim 1, wherein determining the direction to shift pixels of the second corresponding image comprises selecting an angle perpendicular to a direction of a linear feature in the structure.

5. The method of linear feature detection according to claim 1, wherein determining the direction to shift pixels of the second corresponding image comprises an iterative process of determining, by the computing device, an angle of a linear feature in the structure and selecting a direction perpendicular to the angle of the linear feature in the structure.

6. The method of linear feature detection according to claim 1, wherein inputting the pixel shift value to shift pixels of the second corresponding digital image includes inputting a shift value between 1 to 5 pixels.

7. The method of linear feature detection according to claim 1, further comprising:
   inputting a new incremented pixel shift value to shift pixels of the third corresponding digital image;
   shifting, by the computing device, pixels of the third corresponding digital image by the input new incremented pixel shift value in the determined direction; and
   providing, by the computing device, a fourth corresponding digital image of the structure by subtracting the third corresponding digital image of the structure from the first digital image of the structure, where the fourth corresponding digital image capable of further graphically enhancing a linear feature on the structure imaged in the first digital image.

8. A system, comprising:
   one or more computer processors; and
   a memory containing computer program code that, when executed by the one or more computer processors, performs an operation for linear feature detection in a structure, the operation comprising:
      providing a first digital image of a structure;
      providing a second corresponding digital image of the structure from the first digital image;
      shifting the second digital image by at least 1 pixel in a direction substantially perpendicular to a linear feature; and
      determining a third corresponding digital image of the structure by subtracting the second corresponding digital image of the structure from the first digital image of the structure.

9. The system of claim 8, where the third corresponding digital image being capable of graphically enhancing a linear feature on the structure imaged in the first digital image by increasing a signal-to-noise pixel ratio of the imaged linear feature on the structure in the first digital image.

10. The system of claim 8, wherein the first digital image of the structure includes one of:
    an X-ray backscatter image; or
    a three-dimensional image.

11. The system of claim 8, wherein determining the direction to shift pixels of the second corresponding image comprises selecting an angle perpendicular to a direction of a linear feature in the structure.

12. The system of claim 8, wherein determining the direction to shift pixels of the second corresponding image comprises an iterative process of determining, by the computing device, an angle of a linear feature in the structure and selecting a direction perpendicular to the angle of the linear feature in the structure.

13. The system of claim 8, wherein inputting the pixel shift value to shift pixels of the second corresponding digital image includes inputting a shift value between 1 to 5 pixels.

14. The system of claim 8, the operation further comprising:
- inputting a new incremented pixel shift value to shift pixels of the third corresponding digital image;
- shifting, by the computing device, pixels of the third corresponding digital image by the input new incremented pixel shift value in the determined direction; and
- providing, by the computing device, a fourth corresponding digital image of the structure by subtracting the third corresponding digital image of the structure from the first digital image of the structure, where the fourth corresponding digital image capable of further graphically enhancing a linear feature on the structure imaged in the first digital image.

15. A non-transitory computer-readable medium containing computer program code that, when executed by operation of one or more computer processors, performs an operation for linear feature detection in a structure, the operation comprising:
- providing a first digital image of a structure;
- providing a second corresponding digital image of the structure from the first digital image;
- shifting the second digital image by at least 1 pixel in a direction substantially perpendicular to a linear feature; and
- determining a third corresponding digital image of the structure by subtracting the second corresponding digital image of the structure from the first digital image of the structure.

16. The non-transitory computer-readable medium of claim 15, where the third corresponding digital image being capable of graphically enhancing a linear feature on the structure imaged in the first digital image by increasing a signal-to-noise pixel ratio of the imaged linear feature on the structure in the first digital image.

17. The non-transitory computer-readable medium of claim 15, wherein determining the direction to shift pixels of the second corresponding image comprises selecting an angle perpendicular to a direction of a linear feature in the structure.

18. The non-transitory computer-readable medium of claim 15, wherein determining the direction to shift pixels of the second corresponding image comprises an iterative process of determining, by the computing device, an angle of a linear feature in the structure and selecting a direction perpendicular to the angle of the linear feature in the structure.

19. The non-transitory computer-readable medium of claim 15, wherein inputting the pixel shift value to shift pixels of the second corresponding digital image includes inputting a shift value between 1 to 5 pixels.

20. The non-transitory computer-readable medium of claim 15, the operation further comprising:
- inputting a new incremented pixel shift value to shift pixels of the third corresponding digital image;
- shifting, by the computing device, pixels of the third corresponding digital image by the input new incremented pixel shift value in the determined direction; and
- providing, by the computing device, a fourth corresponding digital image of the structure by subtracting the third corresponding digital image of the structure from the first digital image of the structure, where the fourth corresponding digital image capable of further graphically enhancing a linear feature on the structure imaged in the first digital image.

* * * * *